(12) United States Patent
Aquaro et al.

(10) Patent No.: US 6,956,876 B1
(45) Date of Patent: Oct. 18, 2005

(54) METHOD AND APPARATUS FOR COUPLING A MULTIMODE LASER TO A MULTIMODE FIBER

(75) Inventors: Victor Michael Aquaro, Paterson, NJ (US); George Ludwig Fischer, Long Valley, NJ (US); Dietrich Marcuse, Lakewood, NJ (US); Herman Melvin Presby, Highland Park, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/516,274

(22) Filed: Feb. 29, 2000

(51) Int. Cl.$^7$ .................................................. H01S 3/30
(52) U.S. Cl. ........................................... 372/6; 385/43
(58) Field of Search ................................ 372/108, 101

(56) References Cited

U.S. PATENT DOCUMENTS

| | | | | |
|---|---|---|---|---|
| 3,676,667 A | * | 7/1972 | Malifaud | 362/301 |
| 4,060,308 A | * | 11/1977 | Barnoski et al. | 385/43 |
| 4,413,879 A | * | 11/1983 | Berthold, III et al. | 385/36 |
| 4,688,884 A | * | 8/1987 | Scifres et al. | 385/38 |
| 4,698,084 A | * | 10/1987 | Severijns et al. | 65/412 |
| 4,711,514 A | * | 12/1987 | Tangonan et al. | 385/130 |
| 4,763,975 A | * | 8/1988 | Scifres et al. | 385/33 |
| 4,807,954 A | * | 2/1989 | Oyamada et al. | 385/43 |
| 4,818,062 A | * | 4/1989 | Scifres et al. | 385/33 |
| 4,820,010 A | * | 4/1989 | Scifres et al. | 385/43 |
| 4,946,239 A | * | 8/1990 | Garmon | 385/43 |
| 4,986,620 A | * | 1/1991 | Severijns et al. | 385/15 |
| 5,016,963 A | * | 5/1991 | Pan | 385/33 |
| RE33,722 E | * | 10/1991 | Scifres et al. | 385/33 |
| 5,058,978 A | * | 10/1991 | Kondoh et al. | 385/43 |
| 5,305,413 A | * | 4/1994 | Payne | 385/128 |
| 5,351,323 A | * | 9/1994 | Miller et al. | 385/28 |
| 5,352,311 A | * | 10/1994 | Quigley | 156/180 |
| 5,436,990 A | * | 7/1995 | Head et al. | 385/34 |
| 5,455,879 A | * | 10/1995 | Modavis et al. | 385/33 |
| 5,515,464 A | * | 5/1996 | Sheem | 385/49 |
| 5,579,422 A | * | 11/1996 | Head et al. | 385/34 |
| 5,696,779 A | * | 12/1997 | Welch et al. | 372/18 |
| 5,734,766 A | * | 3/1998 | Flint | 385/43 |
| 5,914,978 A | * | 6/1999 | Welch et al. | 372/50 |
| 6,007,225 A | * | 12/1999 | Ramer et al. | 362/554 |
| 6,169,830 B1 | * | 1/2001 | Kewitsch et al. | 385/37 |
| 6,236,782 B1 | * | 5/2001 | Kewitsch et al. | 385/43 |
| 6,252,715 B1 | * | 6/2001 | Rope et al. | 359/618 |
| 6,317,550 B2 | * | 11/2001 | Irie et al. | 385/123 |
| 6,375,364 B1 | * | 4/2002 | Wu | 385/88 |
| 6,385,371 B1 | * | 5/2002 | Li | 385/43 |
| 6,434,302 B1 | * | 8/2002 | Fidric et al. | 385/43 |

* cited by examiner

*Primary Examiner*—Minsun O Harvey
*Assistant Examiner*—Tuan N. Nguyen

(57) ABSTRACT

A method and apparatus are disclosed for coupling a multimode laser to a multimode fiber using a multimode tapered structure. The disclosed multimode tapered structure accepts an optical beam having a highly elliptical beam shape and converts the optical beam for acceptance by the circular multimode optical fiber. According to one aspect of the invention, the multimode tapered structure has a tapered form having an elliptical cross section at one end to match the rectangular laser aperture, and a circular cross section at the other end to match the fiber core. The disclosed multimode tapered structure is tapered from a smaller dimension at the input end that matches the dimension of the multimode light source to a larger dimension at the output end that matches the circular core of the multimode fiber. Depending on the selection of the numerical aperture and the length of the multimode tapered structure, coupling efficiencies up to 98 percent may be achieved with the present invention.

14 Claims, 4 Drawing Sheets

METHOD AND APPARATUS FOR COUPLING A MULTIMODE LASER TO A MULTIMODE FIBER

FIELD OF THE INVENTION

The invention is directed toward the coupling of optical fibers with optical devices using microlenses, and more particularly, to a method and apparatus for coupling a multimode laser to a multimode fiber.

BACKGROUND OF THE INVENTION

A number of coupling techniques have been developed to efficiently couple power between optical fibers and optical devices, especially between a semiconductor laser and an optical fiber, in an optical communication system. For example, an increase in the coupling efficiency and, thus, a decrease in the coupling loss between the laser and the fiber, permits an increase in the repeater spacing in long-haul transmission systems. However, efficient coupling of semiconductor lasers to optical fibers has been a problem of general concern since the advent of optical fiber communications. In a single mode fiber implementation, the laser light power that can be launched into the single mode fiber suffers a loss on the order of 7–11 dB using conventional butt-joint coupling. Thus, coupling efficiency has been universally improved by using either a microlens on the end of the fiber to match the modes of the laser and optical fiber or by bulk optics or by a combination of microlenses and bulk optics. Microlenses have been more commonly used because of their ease of fabrication and packaging.

Generally, as a result of coupling inefficiencies, a percentage of the laser output is not utilized. Thus, the laser has to be run at a correspondingly higher current to yield the same coupled power into fiber that a more efficient coupling scheme could provide. In addition, operation of the laser at higher currents results in greater heat to be dissipated and raises questions of long term stability and reliability of the laser itself. Thus, a number of variations have been proposed or suggested to the shape or the manner in which the microlenses are fabricated, in order to gain improvements in the coupling efficiency of such microlenses.

For example, U.S. Pat. No. 5,011,254, issued to C. A. Edwards and H. M. Presby, assigned to the assignee of the present invention and incorporated by reference herein, discloses the use of hyperbolically-shaped microlensed fibers that provide greater than 90 percent coupling efficiencies for coupling light from single-mode light sources, such as semiconductor lasers with symmetric modal outputs, to single-mode fibers and from the single-mode fibers to detectors. While such microlenses afford relatively high coupling efficiency, they are useful only for single-mode lasers having a symmetric modal output, where the output beam profiles are generally circular, and therefore have ellipticity ratios that are close to 1:1.

Many lasers, however, have a highly elliptical beam shape emanating from the laser facet and exhibit strong modal asymmetries. Thus, in lasers exhibiting such strong modal asymmetries, the use of symmetric microlenses for coupling such lasers to fibers leads to a significant decrease in the coupling efficiencies. U.S. Pat. No. 5,256,851, issued to H. M. Presby, assigned to the assignee of the present invention and incorporated by reference herein, discloses methods and apparatus for fabricating asymmetric microlenses on single-mode optical fibers.

While the above-described coupling techniques are satisfactory for single-mode optical environments, there are increasing applications of multimode lasers and multimode fibers in optical communication systems. Generally, multimode lasers exhibit a non-symmetrical, highly elliptical beam shape emanating from the laser facet. The ellipticity ratios for such multimode lasers are generally on the order of 3:1. Thus, a need therefore exists for a method and apparatus for efficiently coupling using a microlens. A further need exists for a microlens that accepts an optical beam having a highly elliptical beam shape and converts the optical beam for acceptance by the circular multimode optical fiber. Unlike the single mode asymmetric situation, where the lens is formed only over the core region, which may encompass, for example, 10 microns out of the 125 micron diameter, in the multimode case, the core can be a substantial portion of the overall diameter, such as 100 microns out of the 125 micron diameter. Thus, the lens must have a much larger area, requiring the development of new fabrication methods.

U.S. patent application Ser. No. 09/244,635, filed Feb. 4, 1999, entitled "Apparatus, System and Method for Coupling Multimode Light Sources to Multimode Optical Fiber," assigned to the assignee of the present invention and incorporated by reference herein, discloses a hyperbolic lens formed on a multimode fiber to facilitate the optical coupling of a multimode laser to a multimode fiber. While the disclosed hyperbolic lens provides significant improvements for efficiently coupling a multimode laser to a multimode fiber, the disclosed hyperbolic lens suffers from a number of limitations which, if overcome, could further expand the utility and efficiency of such multimode microlenses. Specifically, the disclosed hyperbolic lens requires the tailored shaping of the end of the fiber to achieve the hyperbolic shape, thereby increasing the fabrication costs due to the required tolerances that must be achieved.

SUMMARY OF THE INVENTION

Generally, a method and apparatus are disclosed for coupling a multimode laser to a multimode fiber using a multimode tapered structure. The disclosed multimode tapered structure accepts an optical beam having a highly elliptical beam shape and converts the optical beam for acceptance by the circular multimode optical fiber. According to one aspect of the invention, the multimode tapered structure has a tapered form having an elliptical cross section at one end to match the rectangular laser aperture, and a circular cross section at the other end to match the fiber core.

More specifically, the disclosed multimode tapered structure is tapered from a smaller dimension at the input end that matches the dimension of the multimode light source to a larger dimension at the output end that matches the core of the multimode fiber. Depending on the selection of the numerical aperture and the length of the multimode tapered structure, coupling efficiencies up to 98 percent may be achieved with the present invention.

A more complete understanding of the present invention, as well as further features and advantages of the present invention, will be obtained by reference to the following detailed description and drawings.

DETAILED DESCRIPTION

Figure 1:
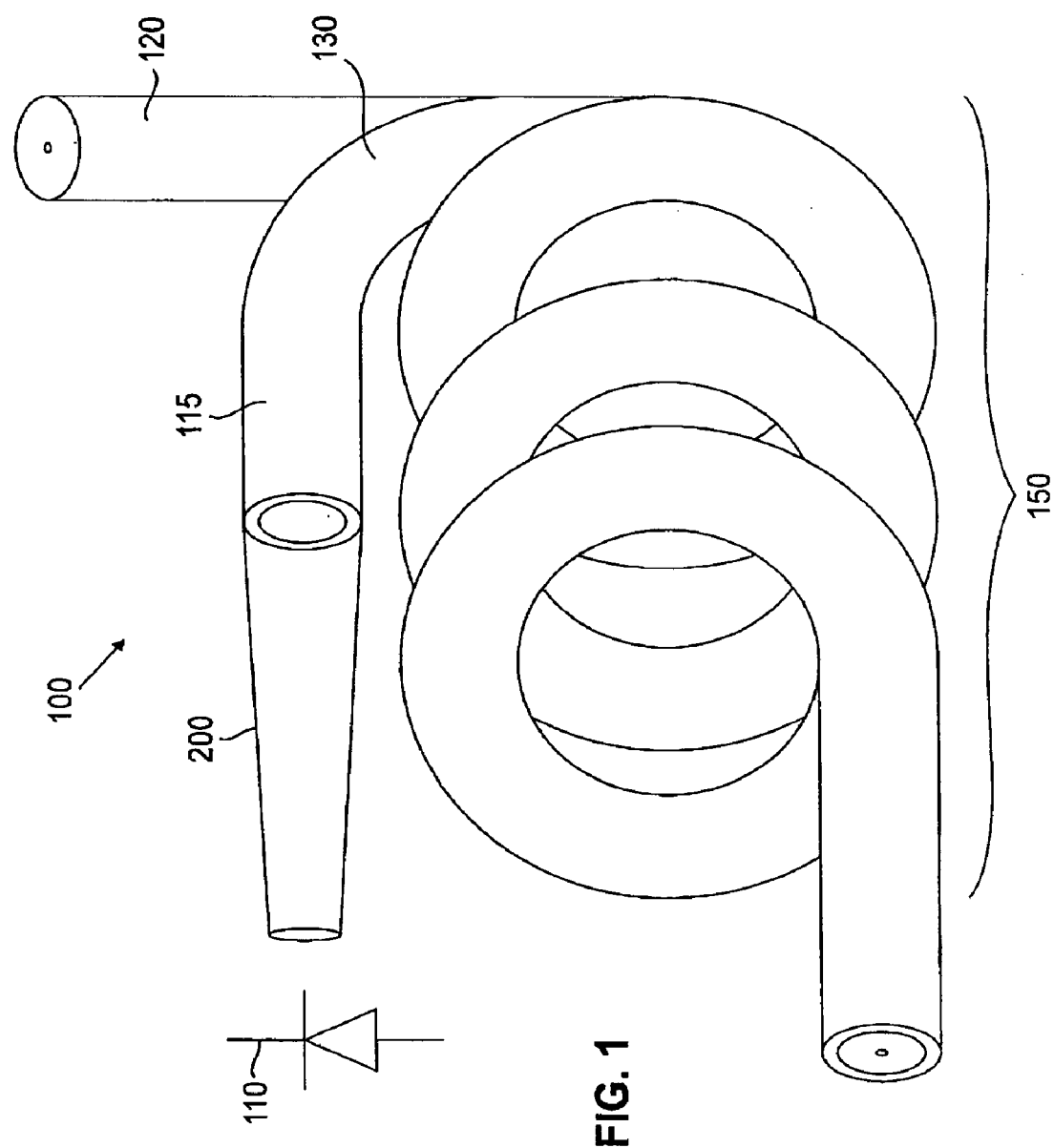
FIG. 1 illustrates an illustrative optical amplifier in which a multimode tapered structure in accordance with the present invention may be employed.

FIG. 1 illustrates an illustrative optical amplifier 100 in which a multimode tapered structure 200 according to the present invention may be employed. According to one feature of the present invention, discussed further below in conjunction with FIG. 2, the lens of a conventional coupler is replaced by a tapered structure having an elliptical cross section at one end to match the rectangular laser aperture, and a circular cross section at the other end to match the fiber core. Thus, the multimode tapered structure 200 accepts a multimode optical beam having a highly elliptical beam shape and converts the optical beam for acceptance by a circular multimode optical fiber.

The optical amplifier 100 includes a multimode light source 110, such as a multimode laser diode, the multimode tapered structure 200 of the present invention, a single-mode input signal fiber 120, a single-mode coupler 130 and a spooled double-clad amplifier fiber 150. The multimode tapered structure 200 couples the optical beam from the multimode light source 110 into the fiber 115. The multimode optical beam having a first wavelength is absorbed in the spooled double-clad amplifier fiber 150 and energy having the wavelength of the input signal is produced. In this manner, the input signal is amplified.

Figure 2A:
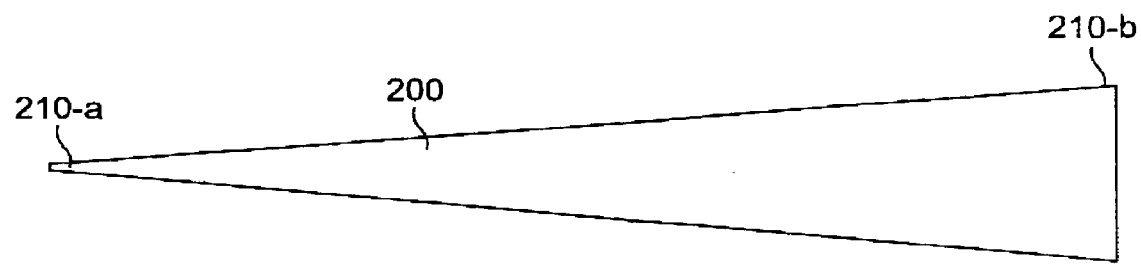
FIGS. 2A through 2C illustrate the multimode tapered structure in further detail from a side view, back oblique view and a front oblique view, respectively.
Figure 2B:
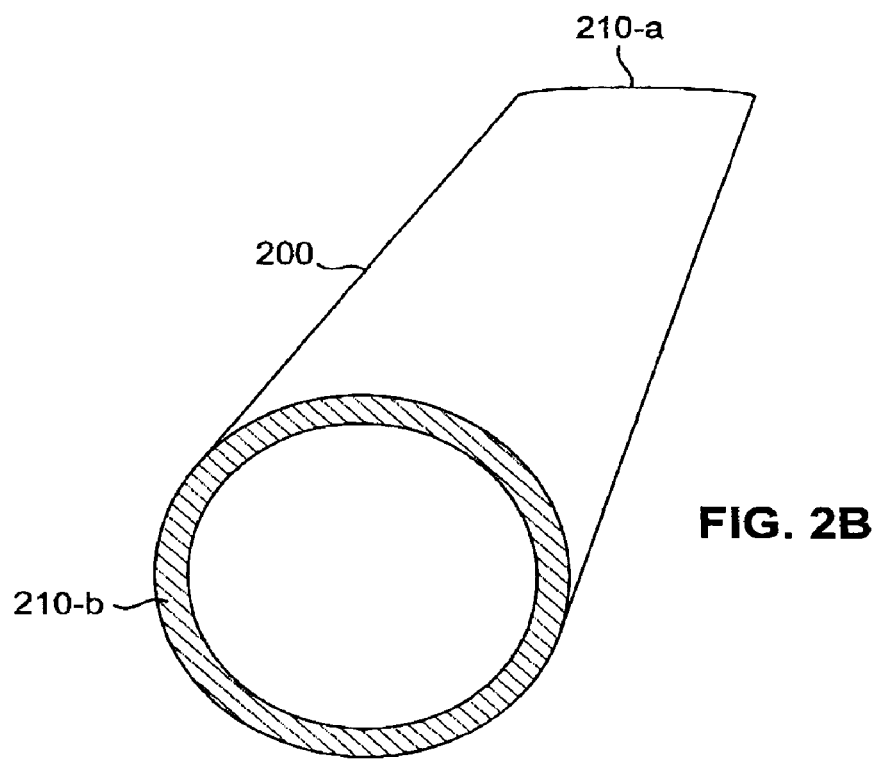
Figure 2C:
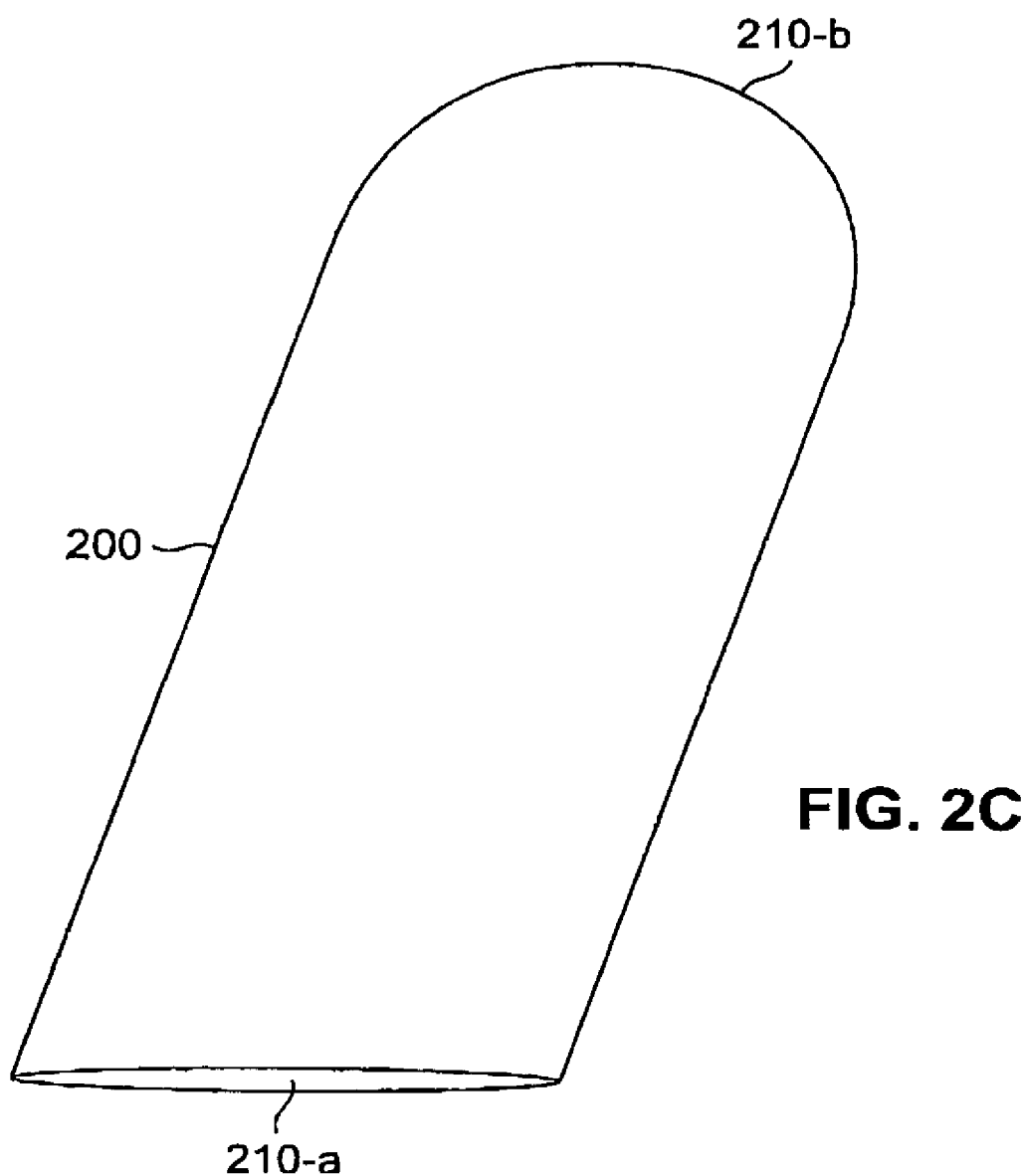

FIGS. 2A through 2C illustrate the multimode tapered structure 200 in further detail from a side view, back oblique view and a front oblique view, respectively. As previously indicated, the multimode tapered structure 200 according to the present invention utilizes a tapered structure having an elliptical cross section at one end 210-*a* to match the rectangular laser aperture, and a circular cross section at the other end 210-*b* to match the fiber core.

Thus, as shown most clearly in FIG. 2A, the multimode tapered structure 200 is tapered from a smaller dimension at the input end 210-*a* that matches the dimension of the multimode light source 110 to a larger dimension at the output end 210-*b* that matches the fiber core. The circular diameter of the output end 210-*b* of the multimode tapered structure 200, shown most clearly in FIG. 2B, is matched to the multimode fiber core. The elliptical cross section at one end 210-*a*, shown most clearly in FIG. 2C, is matched to the multimode output of the light source 110.

Figure 3:
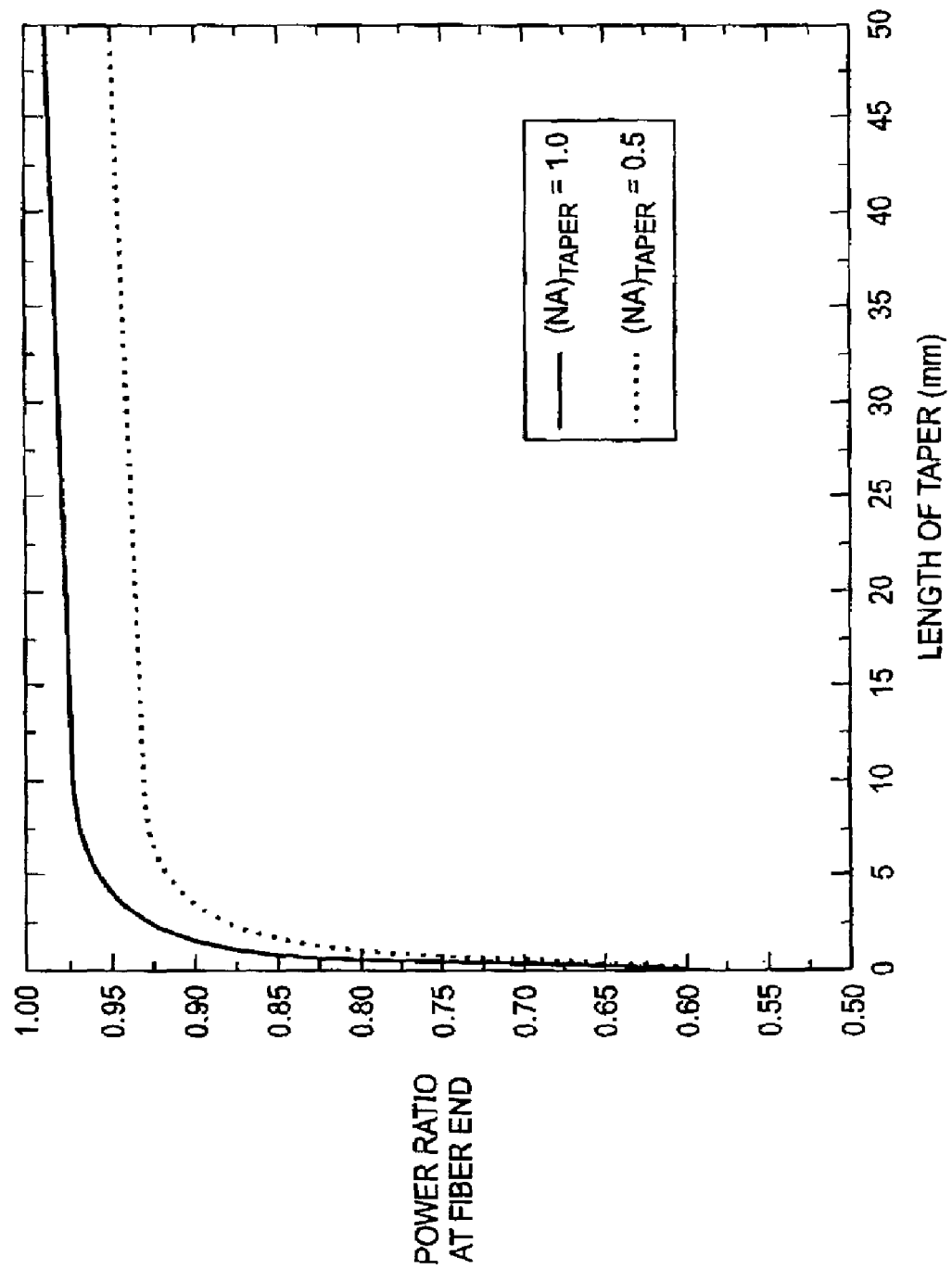
FIG. 3 illustrates the power ratio at the fiber end as a function of the length of the multimode tapered structure for multimode tapered structurees fabricated using different numerical apertures.

An appropriate numerical aperture of the multimode tapered structure 200 may be selected with reference to FIG. 3. FIG. 3 illustrates the power ratio at the fiber end as a function of the length of the multimode tapered structure for multimode tapered structurees fabricated using different numerical apertures. As shown in FIG. 3, the present invention can theoretically achieve a power ratio of approximately 98 percent with a multimode tapered structure 200 having a length of 50 mm and fabricated with a material having a numerical aperture of 1.0.

The tapered structure 200 can be fabricated in a cylindrical rod of fused silicon material, having a uniform index and a diameter equal to the core diameter of the fiber that is being coupled to. The end of the cylinder is ground and polished to give the desired shape. The tapered structure 200 is then cut and fused to the end of the optical fiber being coupled to.

It is to be understood that the embodiments and variations shown and described herein are merely illustrative of the principles of this invention and that various modifications may be implemented by those skilled in the art without departing from the scope and spirit of the invention.

We claim:

1. A multimode tapered structure for coupling a multimode laser to a multimode fiber, comprising:
   an input end having an elliptical cross section for coupling with said multimode laser; and an output end having a circular cross section for coupling with said multimode fiber, wherein said multimode tapered structure is tapered from a smaller dimension at said input end to a larger dimension at said output end.

2. The multimode tapered structure of claim 1, wherein said elliptical cross section approximately matches a rectangular aperture of said multimode laser.

3. The multimode tapered structure of claim 1, wherein said circular cross section approximately matches a core of said multimode fiber.

4. The multimode tapered structure of claim 1, wherein said multimode tapered structure has a numerical aperture that is selected to provide a desired coupling efficiency.

5. The multimode tapered structure of claim 1, wherein said multimode tapered structure has a length that is selected to provide a desired coupling efficiency.

6. The multimode tapered structure of claim 1, wherein said multimode tapered structure accepts an optical beam having a highly elliptical beam shape and converts said optical beam for acceptance by said circular multimode optical fiber.

7. An optical coupling system, comprising:
   a multimode laser source having a rectangular aperture;
   a multimode fiber having a core surrounded by a cladding; and
   a multimode tapered structure for coupling said multimode laser to said multimode fiber, said multimode tapered structure having an input end and an output end, said input end having an elliptical cross section for coupling with said multimode laser and said output end having a circular cross section for coupling with said multimode fiber, wherein said multimode tapered structure is tapered from a smaller dimension at said input end to a larger dimension at said output end.

8. The optical coupling system of claim 7, wherein said elliptical cross section approximately matches said rectangular aperture of said multimode laser.

9. The optical coupling system of claim 7, wherein said circular cross section approximately matches said core of said multimode fiber.

10. The optical coupling system of claim 7, wherein said multimode tapered structure has a numerical aperture that is selected to provide a desired coupling efficiency.

11. The optical coupling system of claim 7, wherein said multimode tapered structure has a length that is selected to provide a desired coupling efficiency.

12. The optical coupling system of claim 7, wherein said multimode tapered structure accepts an optical beam having a highly elliptical beam shape and converts said optical beam for acceptance by said circular multimode optical fiber.

13. A method of coupling a multimode laser to a multimode optical fiber, said method comprising the steps of:
   generating a multimode laser beam in a multimode laser source having an aperture; and
   positioning a multimode tapered structure to face said laser aperture, said multimode tapered structure coupling said multimode laser to said multimode fiber, said multimode tapered structure having an input end and an output end, said input end having an elliptical cross section for coupling with said multimode laser and said output end having a circular cross section for coupling with said multimode optical fiber, wherein said multimode tapered structure is tapered from a smaller dimension at said input end to a larger dimension at said output end.

14. A method for fabricating a multimode tapered structure for coupling a multimode laser to a multimode optical fiber, said multimode tapered structure having an input end and an output end, said input end having an elliptical cross section for coupling with said multimode laser and said output end having a circular cross section for coupling with said multimode optical fiber, said method comprising the steps of:

selecting a cylindrical rod of fused silicon material having a uniform index and a diameter equal to a core diameter of said multimode fiber;

grinding said input end of said cylinder rod to obtain said elliptical cross section and tapering of said cylinder rod from a smaller dimension at said input end to a larger dimension at said output end; and fusing said rod to said multimode optical fiber.

* * * * *